United States Patent
Matsuoka

(10) Patent No.: US 10,428,214 B2
(45) Date of Patent: Oct. 1, 2019

(54) CATIONICALLY CURABLE RESIN COMPOSITION

(71) Applicant: THREEBOND CO., LTD., Tokyo (JP)

(72) Inventor: Hiroto Matsuoka, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 16/091,702

(22) PCT Filed: Apr. 3, 2017

(86) PCT No.: PCT/JP2017/013994
§ 371 (c)(1),
(2) Date: Oct. 5, 2018

(87) PCT Pub. No.: WO2017/175735
PCT Pub. Date: Oct. 12, 2017

(65) Prior Publication Data
US 2019/0136041 A1    May 9, 2019

(30) Foreign Application Priority Data

Apr. 6, 2016  (JP) .................................. 2016-076244

(51) Int. Cl.
| | | |
|---|---|---|
| C08F 2/46 | (2006.01) | |
| C08F 2/50 | (2006.01) | |
| C08G 61/04 | (2006.01) | |
| C08L 63/00 | (2006.01) | |
| C08G 59/00 | (2006.01) | |
| C08G 59/24 | (2006.01) | |
| C08K 5/3477 | (2006.01) | |

(52) U.S. Cl.
CPC .............. *C08L 63/00* (2013.01); *C08G 59/00* (2013.01); *C08G 59/24* (2013.01); *C08K 5/3477* (2013.01); *C08L 2201/08* (2013.01)

(58) Field of Classification Search
USPC ............. 522/15, 12, 7, 6, 189, 184, 1; 520/1
See application file for complete search history.

(56) References Cited

U.S. PATENT DOCUMENTS

| | | | |
|---|---|---|---|
| 7,964,248 B2 * | 6/2011 | Fong ..................... | C07C 381/12 427/466 |
| 2007/0208106 A1 | 9/2007 | Chen et al. | |

FOREIGN PATENT DOCUMENTS

| | | |
|---|---|---|
| JP | S59-204676 A | 11/1984 |
| WO | 2005/059002 A1 | 6/2005 |

OTHER PUBLICATIONS

International Search Report with English translation and Written Opinion dated Jul. 11, 2017 of corresponding International Application No. PCT/JP2017/013994; 11 pgs.

\* cited by examiner

*Primary Examiner* — Jessica Whiteley
(74) *Attorney, Agent, or Firm* — Maier & Maier, PLLC

(57) ABSTRACT

The present invention addresses the problem of providing a cationically curable resin composition having storage stability while maintaining photocurability and low-temperature (less than 100° C.) curability. The cationically curable resin composition can include component (A): a cationically polymerizable compound, component (B): a photo-cationic polymerization initiator, component (C): a thermal cationic polymerization initiator, and component (D): a compound having an isocyanuric ring. Also, the content of the component (D) can be 0.01 to 7 parts by mass per 100 parts by mass of the component (A).

12 Claims, No Drawings

CATIONICALLY CURABLE RESIN COMPOSITION

FIELD

The present invention relates to a cationically curable resin composition having storage stability while maintaining photocurability and low-temperature (less than 100° C.) curability.

BACKGROUND

Cationically polymerizable resin compositions containing an epoxy resin, etc., have excellent adhesion strength, sealing properties, high strength, heat resistance, electrical characteristics, and chemical resistance, and thus have been conventionally used for various applications, including adhesives, sealants, potting agents, coating agents, electrically conductive pastes, and the like. In addition, the applications have a wide variety of targets. Particularly in electronics, they have been used for semiconductors, flat panel displays such as liquid crystal displays, organic electroluminescence, and touch panels, hard disk devices, mobile terminal devices, camera modules, and the like.

Patent Literature 1 (JP 59-204676 A) discloses a photo-cationically polymerizable resin composition containing an epoxy resin and a photo-cationic initiator that generates a Lewis acid upon active energy ray irradiation, such as UV irradiation. In addition, Patent Literature 2 (WO 2005/059002 A) discloses a cationically curable epoxy resin composition containing an epoxy resin composition, a photo-cationic initiator, a thermal cationic initiator, and a filler.

SUMMARY

However, the cationically polymerizable resin composition disclosed in Patent Literature 1 has been problematic in that the part unexposed to light cannot be cured. In order to solve this problem, it will be possible to perform heating to about 200° C. to cause the cationic initiator to generate an acid, thereby curing the composition. However, because the temperature of curing conditions is too high, there has been a problem in that applications to liquid crystal or organic EL devices, which are prone to thermal degradation, are difficult. In addition, with respect to the cationically curable epoxy resin composition disclosed in Patent Literature 2, because of the combined use of a photo-cationic initiator and a thermal cationic initiator, gelation takes place at room temperature within a few days, that is, the storage stability is poor.

An object of the present invention is to solve the above problems, that is, to provide a cationically curable resin composition having storage stability while maintaining photocurability and low-temperature curability.

The present invention is to overcome the problems of related art described above. That is, the present invention is as follows.

A cationically curable resin composition including:
component (A): a cationically polymerizable compound;
component (B): a photo-cationic polymerization initiator;
component (C): a thermal cationic polymerization initiator; and
component (D): a compound having an isocyanuric ring, the content of the component (D) being 0.01 to 7 parts by mass per 100 parts by mass of the component (A).

DETAILED DESCRIPTION

A first embodiment of the present invention is a cationically curable resin composition including:
component (A): a cationically polymerizable compound;
component (B): a photo-cationic polymerization initiator;
component (C): a thermal cationic polymerization initiator; and
component (D): a compound having an isocyanuric ring, the content of the component (D) being 0.01 to 7 parts by mass per 100 parts by mass of the component (A).

The cationically curable resin composition of the present invention has storage stability while maintaining photocurability and low-temperature (less than 100° C.) curability.

The present invention will be described in detail hereinafter.

Incidentally, as used herein, the expression "X to Y" is used to mean that the first and last numerical values (X and Y) are included as the lower limit and the upper limit. In addition, unless otherwise noted, the operations and the measurement of physical properties and the like are performed under conditions of room temperature (20 to 25° C.)/40 to 50% relative humidity. In addition, the term "(meth)acrylate" encompasses both methacrylate and acrylate.

<Component (A)>

A cationically polymerizable compound (also referred to as "cationically curable compound") to serve as the component (A) of the present invention is a compound that causes a crosslinking reaction with a cationic species generated from a cationic polymerization initiator upon active energy ray irradiation or heating. The component (A) is not particularly limited, and may be, for example, an epoxy compound such as an epoxy resin, an oxetane compound, a vinyl ether compound, or the like. Among them, in terms of excellent characteristics of a cured product, epoxy compounds are preferable. They may be used alone, and it is also possible to use a combination of two or more kinds.

In terms of excellent workability and low-temperature curability, it is preferable that the component (A) is a substance that is liquid at 25° C. In addition, the viscosity at 25° C. is preferably 0.1 to 30,000 mPa·s, still more preferably 1 to 15,000 mPa·s, and particularly preferably 10 to 1,000 mPa·s.

Examples of epoxy compounds to serve as the component (A) include epoxy resins, such as aromatic epoxy resins and hydrogenated (hydrogenation) epoxy resins, and alicyclic epoxy compounds. Among them, in terms of excellent low-temperature curability, hydrogenated epoxy resins and alicyclic epoxy compounds are preferable. Incidentally, a hydrogenated epoxy resin means a compound obtained by the nuclear hydrogenation of the aromatic ring of an epoxy resin, for example.

The hydrogenated epoxy resins are not particularly limited, and examples thereof include hydrogenated bisphenol A epoxy resins, hydrogenated bisphenol F epoxy resins, hydrogenated bisphenol E epoxy resins, diglycidyl ethers of alkylene oxide adducts of hydrogenated bisphenol A, diglycidyl ethers of alkylene oxide adducts of hydrogenated bisphenol F, hydrogenated phenol novolac epoxy resins, and hydrogenated cresol novolac epoxy resins. In particular, hydrogenated bisphenol A epoxy resins, hydrogenated bisphenol F epoxy resins, and hydrogenated bisphenol E epoxy resins are preferable for their excellent low-temperature curability.

Examples of commercially available products of the hydrogenated bisphenol A epoxy resins include YX-8000, YX-8034 (manufactured by Mitsubishi Chemical Corporation), EXA-7015 (Manufactured by DIC Corporation), ST-3000 (manufactured by Nippon Steel & Sumikin Chemical Co., Ltd.), RIKARESIN HBE-100 (New Japan Chemical Co., Ltd.), and EX-252 (Nagase ChemteX Corporation). In addition, examples of commercially available products of the hydrogenated bisphenol F epoxy resins include YL-6753 (manufactured by Mitsubishi Chemical Corporation).

The alicyclic epoxy compounds are not particularly limited, and examples thereof include 3',4'-epoxycyclohexylmethyl 3,4-epoxycyclohexanecarboxylate, ε-caprolactone-modified 3',4'-epoxycyclohexylmethyl 3,4-epoxycyclohexanecarboxylate, bis(3,4-epoxycyclohexyl) adipate, 1,2-epoxy-4-vinylcyclohexane, 1,4-cyclohexanedimethanol diglycidyl ether, epoxyethyldivinylcyclohexane, diepoxyvinylcyclohexane, 1,2,4-triepoxyethylcyclohexane, limonene dioxide, and alicyclic epoxy group-containing silicone oligomers.

Commercially available products of the alicyclic epoxy compounds are not particularly limited, and examples thereof include, but are not limited to, Celloxide 2081, Celloxide 2021P, Celloxide 2000, Celloxide 3000, and EHPE 3150 (manufactured by Daicel Corporation), TTA21 (manufactured by Jiangsu TetraChem), RIKARESIN DM E-100 (manufactured by New Japan Chemical Co., Ltd.), and X-40-2670, X-22-169AS, and X-22-169B (Shin-Etsu Chemical).

Examples of the aromatic epoxy resins include aromatic bisphenol A epoxy resins, aromatic bisphenol-F type epoxy resins, aromatic bisphenol E epoxy resins, diglycidyl ethers of alkylene oxide adducts of aromatic bisphenol A, diglycidyl ethers of alkylene oxide adducts of aromatic bisphenol F, diglycidyl ethers of alkylene oxide adducts of aromatic bisphenol E, aromatic novolac epoxy resins, urethane-modified aromatic epoxy resins, nitrogen-containing aromatic epoxy resins, and rubber-modified aromatic epoxy resins containing a polybutadiene or nitrile-butadiene rubber (NBR), etc.

Examples of commercially available products of the aromatic epoxy resins include, but are not limited to jER825, 827, 828, 828EL, 828US, 828XA, 834, 806, 806H, 807, 604, and 630 (manufactured by Mitsubishi Chemical Corporation), EPICLON 830, EXA-830LVP, EXA-850CRP, 835LV, HP4032D, 703, 720, 726, HP820, N-660, N-680, N-695, N-655-EXP-S, N-665-EXP-S, N-685-EXP-S, N-740, N-775, and N-865 (manufactured by DIC Corporation), EP4100, EP4000, EP4080, EP4085, EP4088, EP4100HF, EP4901HF, EP4000S, EP4000L, EP4003S, EP4010S, and EP4010L (manufactured by ADEKA Corporation), and Denacol EX614B, EX411, EX314, EX201, EX212, and EX252 (manufactured by Nagase ChemteX Corporation). They may be used alone, and it is also possible to use a mixture of two or more kinds.

Examples of the oxetane compounds include 3-ethyl-3-hydroxymethyloxetane, 3-(meth)aryloxymethyl-3-ethyloxetane, methylbenzene(3-ethyl-3-oxetanylmethoxy), 4-fluoro-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl) ether, 2-ethylhexyl (3-ethyl-3-oxetanylmethyl) ether, ethyl diethylene glycol (3-ethyl-3-oxetanylmethyl)ether, tetrahydrofurfuryl(3-ethyl-3-oxetanylmethyl) ether, tetrabromophenyl(3-ethyl-3-oxetanylmethyl) ether, 2-tetrabromophenoxyethyl(3-ethyl-3-oxetanylmethyl) ether, pentachlorophenyl(3-ethyl-3-oxetanylmethyl) ether, pentabromophenyl(3-ethyl-3-oxetanylmethyl) ether, ethylene glycose bis(3-ethyl-3-oxetanylmethyl) ether, triethylene glycol bis(3-ethyl-3-oxetanylmethyl) ether, tetraethyleneglycol bis(3-ethyl-3-oxetanylmethyl) ether, trimethylolpropane tris(3-ethyl-3-oxetanylmethyl) ether, pentaerythritol tris(3-ethyl-3-oxetanylmethyl) ether, pentaerythritol tetrakis(3-ethyl-3-oxetanylmethyl) ether, dipentaerythritol tetrakis(3-ethyl-3-oxetanylmethyl) ether, and ditrimethylolpropane tetrakis(3-ethyl-3-oxetanylmethyl) ether. Examples of commercially available products of the oxetane compounds include OXT-212, OXT-221, OXT-213, and OX T-101 (manufactured by Toagosei Co., Ltd.).

Examples of the vinyl ether compounds include 1,4-butanediol divinyl ether, diethylene glycol divinyl ether, triethylene glycol divinyl ether, tetraethylene glycol divinyl ether, n-propylvinyl ether, isopropyl vinyl ether, n-butyl vinyl ether, isobutyl vinyl ether, 2-ethylhexyl vinyl ether, cyclohexyl vinyl ether, 2-hydroxyethyl vinyl ether, diethylene glycol monovinyl ether, 4-hydroxybutyl vinyl ether, 2-(2-vinyloxyethoxy)ethyl acrylate, and 2-(2-vinyloxyethoxy)ethyl methacrylate. Examples of commercially available products of the vinyl ether compounds include NPVE, IPVE, NBVE, IBVE, and EHVECHVE (manufactured by Nippon Carbide Industries Co., Inc.), HEVE, DEGV, and HBVE (manufactured by Maruzen Petrochemical Co., Ltd.), and VEEA and VEEM (manufactured by Nippon Shokubai Co., Ltd.).

In addition, in the case where two or more kinds of cationically polymerizable compounds are used in combination as the component (A), it is preferable that a hydrogenated bisphenol A epoxy resin is contained in an amount of more than 80 mass %, more preferably 90 mass % or more, based on the entire component (A). Within the above range, the storage stability of the cationically curable resin composition can be further improved.

<Component (B)>

The component (B) of the present invention is a photo-cationic polymerization initiator, which is a compound that generates a cationic species upon active energy ray irradiation. The component (B) is not particularly limited, and examples thereof include aromatic sulfonium-based photo-cationic polymerization initiators and aromatic iodonium-based photo-cationic polymerization initiators. They may be used alone, and it is also possible to use two or more kinds together. Incidentally, an initiator that generates a cationic species with heat and also with an active energy ray is defined as the component (B) in the present invention.

Examples of the aromatic sulfonium-based photo-cationic polymerization initiators include, but are not limited to, triphenylsulfonium hexafluorophosphate, triphenylsulfonium hexafluoroantimonate, triphenylsulfonium tetrakis (pentafluorophenyl)borate, 4,4'-bis[diphenylsulfonio]diphenylsulfide-bishexafluorophosphate, 4,4'-bis[di(β-hydroxyethoxy)phenylsulfonio]diphenylsulfide-bishexafluoroantimonate, 4,4'-bis[di(β-hydroxyethoxy)phenylsulfonio]diphenylsulfide-bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenylsulfide-hexafluorophosphate, 4-(p-ter-butylphenylcarbonyl)-4'-diphenylsulfonio-diphenylsulfide-hexafluoroantimonate, and 4-(p-ter-butylphenylcarbonyl)-4'-di(p-tolyl)sulfoniodiphenylsulfide-tetrakis (pentafluorophenyl)borate. These aromatic sulfonium-based photo-cationic polymerization initiators may be used alone or as a mixture.

Examples of commercially available products of the aromatic sulfonium-based photo-cationic polymerization initiators include SP-150, SP-170, and SP-172 (manufactured by ADEKA Corporation Co., Ltd.), CPI-100P, CPI-101A, CPI-110B, CPI-200K, and CPI-210S (manufactured by San-Apro Ltd.), T1608, T1609, T2041, and T2042 (manufactured by Tokyo Kasei Kogyo Co., Ltd.), UVI-6990 and UVI-6974 (manufactured by Union Carbide Corporation), and DTS-200 (manufactured by Midori Kagaku Co., Ltd.).

Examples of the aromatic iodonium-based photo-cationic polymerization initiators include diphenyliodonium tetrakis (pentafluorophenyl)borate, diphenyliodonium hexafluorophosphate, diphenyliodonium hexafluoroantimonate, di(4-nonylphenyl)iodonium hexafluorophosphate, and 4-methylphenyl-4-(1-methylethyl)phenyliodonium tetrakis (pentafluorophenyl)borate.

Examples of commercially available products of the aromatic iodonium-based photo-cationic polymerization initiators include IRGACURE 250 (manufactured by BASF), PI-2074 (manufactured by Rhodia), B2380, B2381, D2238, D2248, D2253, and 10591 (manufactured by Tokyo Kasei Kogyo Co., Ltd.), and WPI-113, WPI-116, WPI-169, WPI-170, and WPI-124 (manufactured by Wako Pure Chemical Industries, Ltd.).

The amount of the component (B) blended in the cationically curable resin composition of the present invention is not particularly limited, but is preferably within a range of 0.1 to 30 parts by mass, more preferably 0.5 to 15 parts by mass, per 100 parts by mass of the component (A). When 0.1 parts by mass or more of the component (B) is contained, photocurability can be ensured, while when 30 parts by mass or less is contained, solubility in the component (A) can be ensured.

<Component (C)>

The component (C) of the present invention is a thermal cationic polymerization initiator, which is a compound that generates cationic species upon heating. The component (C) is not particularly limited, and examples thereof include aromatic sulfonium-based thermal cationic polymerization initiators and aromatic iodonium-based thermal cationic polymerization initiators. They may be used alone, and it is also possible to use two or more kinds together.

Examples of commercially available products of the aromatic sulfonium-based thermal cationic polymerization initiators include SI-60, SI-60L, SI-80, SI-80L, SI-100, SI-100L, SI-180L, SI-B2A, and SI-B3A (manufactured by Sanshin Chemical Industry Co., Ltd.) and CI-2624 (manufactured by Nippon Soda Co., Ltd.). In addition, examples of the aromatic iodonium-based thermal cationic polymerization initiators include diphenyliodonium trifluoromethanesulfonate (reagent).

The amount of the component (C) blended in the cationically curable resin composition of the present invention is not particularly limited, but is preferably within a range of 0.1 to 30 parts by mass, more preferably 0.1 to 15 parts by mass, and still more preferably 0.5 to 15 parts by mass per 100 parts by mass of the component (A). When 0.1 parts by mass or more of the component (C) is contained, low-temperature curability can be obtained, while when 30 parts by mass or less is contained, a decrease in storage stability can be suppressed.

<Component (D)>

The component (D) of the present invention is a compound having an isocyanuric ring. When a predetermined content of the component (D) of the present invention is combined with other components of the present invention, the effect of having storage stability while maintaining low-temperature (less than 100° C.) curability is caused. Examples of the component (D) include compounds containing a (meth)acryloyl group and an isocyanuric ring, compounds containing an allyl group and an isocyanuric ring, compounds containing a glycidyl group and an isocyanuric ring, and compounds containing a mercapto group and an isocyanuric ring. Among them, in terms of having storage stability while maintaining photocurability and low-temperature (less than 100° C.) curability, compounds containing a (meth)acryloyl group and an isocyanuric ring, compounds containing an allyl group and an isocyanuric ring, and compounds containing a glycidyl group and an isocyanuric ring are preferable, and compounds containing a (meth)acryloyl group and an isocyanuric ring and compounds containing an allyl group and an isocyanuric ring are particularly preferable. These may be used alone or as a mixture.

The compounds containing a (meth)acryloyl group and an isocyanuric ring are not particularly limited, and examples thereof include bis((meth)acryloxymethyl)hydroxymethyl isocyanurate, bis((meth)acryloxyethyl)hydroxyethyl isocyanurate, tris((meth)acryloxymethyl) isocyanurate, tris((meth) acryloxyethyl) isocyanurate, and caprolactone-modified tris ((meth)acryloxyethyl) isocyanurate. In addition, examples of commercially available products of the compounds containing a (meth)acryloyl group and an isocyanuric rings include M-313, M-315, and M-325 (manufactured by Toagosei Co., Ltd.), A-9300 and A-9300-1CL (manufactured by Shin-Nakamura Chemical Co., Ltd.), and SR368 (manufactured by Sartomer).

The compounds containing an allyl group and an isocyanuric ring are not particularly limited, and examples thereof include diallyl isocyanurate, triallyl isocyanurate, and derivatives thereof. Examples of commercially available products include TAIC (manufactured by Nippon Kasei Co., Ltd.).

The compounds containing a glycidyl group and an isocyanuric ring are not particularly limited, and examples thereof include monoglycidyl isocyanurate, diglycidyl isocyanurate, and triglycidyl isocyanurate. Examples of commercially available products include TEPIC-S, TEPIC-L, TEPIC-HP, TEPIC-PAS, TEPIC-VL, and TEPIC-UC (manufactured by Nissan Chemical Corporation).

The compounds containing a mercapto group and an isocyanuric ring are not particularly limited, and examples thereof include tris-(3-mercaptopropyl)-isocyanurate, tris-[(3-mercaptopropionyloxy)-ethyl]-isocyanurate, and 1,3,5-tris(3-mercaptobutyloxyethyl)-1,3,5-triazine-2,4,6(1H,3H,5H)-trione. Examples of commercially available products include TSIC (manufactured by Shikoku Chemicals Corporation).

The amount of the component (D) of the present invention blended is 0.01 to 7 parts by mass, still more preferably 0.1 to 6 parts by mass, per 100 parts by mass of the component (A). An amount of 0.01 parts by mass or more results in excellent storage stability, and an amount of 7 parts by mass or less results in the possession of low-temperature curability.

<Component (E)>

Further, without impairing the characteristics of the present invention, the cationically curable resin composition of the present invention may contain a colorant, such as a pigment or a dye, as a component (E). Among them, in terms of durability, pigments are preferable. Among pigments, in terms of excellent concealability, black pigments are preferable. Examples of black pigments include carbon black, titanium oxide black, copper chromium black, cyanine black, and aniline black. Among them, in term of concealability and also dispersibility in the component (A) of the present invention, carbon black is preferable.

The amount of the component (E) blended in the cationically curable resin composition of the present invention is not particularly limited, but is preferably within a range of range of 0.01 to 30 parts by mass, more preferably within a range of 0.1 to 10 parts by mass, per 100 parts by mass of the component (A).

Further, without impairing the characteristics of the present invention, the cationically curable resin composition of the present invention may be blended with suitable amounts of additives, including sensitizing agents, silane coupling agents, polyol compounds, peroxides, thiol compounds, preservation stabilizers, inorganic fillers having an average particle size of 0.001 to 100 μm such as calcium carbonate, magnesium carbonate, titanium oxide, magnesium hydroxide, talc, silica, alumina, glass, aluminum hydroxide, boron nitride, aluminum nitride, and magnesium oxide, electrically conductive particles such as silver, flame retardants, acrylic rubbers, silicone rubbers, plasticizers, organic solvents, antioxidants such as phenolic antioxidants and phosphoric antioxidants, light stabilizers, UV absorbers, defoaming agents, foaming agents, release agents, leveling agents, rheology control agents, tackifiers, curing retarders, polymers and thermoplastic elastomers such as polyimide resins, polyamide resins, phenoxy resins, cyanate esters, poly(meth)acrylate resins, polyurethane resins, polyurea resins, polyester resins, polyvinyl butyral resins, SBS, and SEBS, and the like. As a result of addition, a cationically curable resin composition having even more excellent resin strength, bonding strength, flame retardancy, thermal conductivity, workability, and the like, as well as a cured product thereof, can be obtained.

Examples of the sensitizing agents include 9-fluorenone, antron, dibenzosulfone, fluorene, 2-bromofluorene, 9-bromofluorene, 9,9-dimethylfluorene, 2-fluorofluorene, 2-iodofluorene, 2-fluoreneamine, 9-fluorenol, 2,7-dibromofluorene, 9-aminofluorenehydrochloride, 2,7-diaminofluorene, 9,9'-spirobi[9H-fluorene], 2-fluorenecarboxyaldehyde, 9-fluorenylmethanol, 2-acetylfluorene, benzophenone, diethoxyacetophenone, 2-hydroxy-2-methyl-1-phenylpropane-1-on, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propane-1-on, 2-benzyl-2-dimethylamino-1-(4-morpholinophenyl)butanone, 2-hydroxy-2-methyl-1-[4-(1-methylvinyl)phenyl]propanone oligomers, nitro compounds, and dyes. Their loadings are not particularly limited, but it is necessary to refer to the absorption wavelength and the molar extinction coefficient.

Examples of the silane coupling agents include vinyl group-containing silane coupling agents such as vinyltris(β-methoxyethoxy)silane, vinyltriethoxysilane, and vinyltrimethoxysilane, (meth)acrylic group-containing silane coupling agents such as γ-methacryloxypropyltrimethoxysilane, and amino group-containing silane coupling agents such as N-β-(aminoethyl)-γ-aminopropyltrimethoxysilane, γ-aminopropyltriethoxysilane, and N-phenyl-γ-aminopropyltrimethoxysilane, as well as γ-mercaptopropyltrimethoxysilane, γ-chloropropyltrimethoxysilane, and the like. Among them, glycidyl group-containing silane coupling agents are preferable. Among glycidyl group-containing silane coupling agents, 3-glycidoxypropyltrimethoxysilane and 3-glycidoxypropyltriethoxysilane are preferable. They may be used alone, and it is also possible to use two or more kinds together.

The polyol compounds may be added to adjust the curing rate or further enhance the adhesion strength. Examples of the polyol compounds include aliphatic polyols such as ethylene glycol, propylene glycol, 1,4-butanediol, 1,3-butanediol, 1,9-nonanediol, neopentyl glycol, tricyclodecanedimethylol, cyclohexanedimethylol, trimethylolpropane, glycerin, hydrogenated polybutadiene polyol, and hydrogenated dimer diol; (poly)ether polyols having one or more ether bonds, such as diethylene glycol, tripropylene glycol, polyethylene glycol, polypropylene glycol, polytetramethylene glycol, trimethylolpropane polyethoxytriol, glycerin polypropoxytriol, bisphenol A polyethoxydiol, bisphenol F polyethoxydiol, and ditrimethylol propane; polyester polyol compounds; polycaprolactone polyol compounds; phenolic hydroxyl group-containing polyol compounds; and polycarbonate polyols such as polycarbonate diol.

The cationically curable resin composition of the present invention can be cured by active energy ray irradiation (photocurability). In addition, the cationically curable resin composition of the present invention can be cured by a low temperature (less than 100° C.) (low-temperature curability). Further, the cationically curable resin composition of the present invention can be cured by active energy ray irradiation and a low temperature.

In a method for curing the cationically curable resin composition of the present invention, the heating conditions are not particularly limited. However, the temperature is preferably 45° C. or more and less than 100° C., and more preferably 50° C. or more and less than 95° C., for example. In addition, curing may be caused by active energy ray irradiation. The active energy ray in this case is not particularly limited, and examples thereof include UV rays, electron rays, and visible rays. The integrated light intensity of the active energy ray is preferably 300 to 100,000 mJ/cm$^2$, and the wavelength of the active energy ray is preferably 150 to 830 nm, and more preferably 200 to 400 nm.

Examples of applications of the cationically curable resin composition of the present invention include adhesives, sealants, potting agents, coating agents, electrically conductive pastes, and sheet-shaped adhesives. In addition, examples of specific applications of adhesives, sealants, potting agents, coating agents, electrically conductive pastes, and sheet-shaped adhesives include the field of automobiles, including switch parts, head lamps, parts inside the engine, electrical parts, drive engines, brake oil tanks, and the like; the field of flat panel displays, including liquid crystal displays, organic electroluminescence, touch panels, plasma displays, light-emitting diode displays, and the like; the field of recording, including videodiscs, CDs, DVDs, MDs, pickup lenses, hard disk peripherals, Blu-ray discs, and the like; the field of electronic materials, including sealing materials for electronic parts, electric circuits, electric relays, electrical contacts, or semiconductor devices, die-bonding agents, electrically conductive adhesives, anisotropic electrically conductive adhesives, interlayer adhesives for multilayer substrates including a build-up substrate, and the like; camera modules such as CMOS image sensors; the field of batteries, including Li batteries, manganese batteries, alkaline batteries, nickel-based batteries, fuel cells, silicon-based solar cells, dye-sensitized solar cells, organic solar cells, and the like; the field of optical parts, including optical fiber materials as optical switch peripherals or optical connector peripherals in an optical communication system, optical passive components, optical circuit parts, optoelectronic integrated circuit peripherals, and the like; mobile terminal devices; the field of building construction; the field of aviation; and stereolithography. Particularly preferred applications include a CMOS image sensor, an adhesive for assembling a case and a lens, and a sealant for a liquid crystal display for the purpose of preventing the leakage of back light, preventing the entry of outdoor light, etc.

EXAMPLES

Hereinafter, the present invention will be described in further detail with reference to examples. However, the present invention is not restricted by the following examples.

Preparation of Cationically Curable Resin Composition

Example 1

80 parts by mass of a hydrogenated bisphenol A epoxy resin (a1) (YX8000, manufactured by Mitsubishi Chemical Corporation, viscosity (mPa·s, 25° C.): 1,850) and 20 parts by mass of 3',4'-epoxycyclohexylmethyl 3,4-epoxycyclohexane carboxylate (a2) (Celloxide 2021P, manufactured by Daicel Corporation, viscosity (mPa·s, 25° C.): 100 to 600) as a component (A), 5 parts by mass of an aromatic iodonium salt-containing photo-cationic polymerization initiator (b1) (PI-2074, manufactured by Rhodia) as a component (B), 0.1 parts by mass of an aromatic sulfonium-based thermal cationic polymerization initiator (c1) (SI-B 3A, manufactured by Sanshin Chemical Industry Co., Ltd.) as a component (C), and 0.5 parts by mass of isocyanuric acid EO-modified di- and triacrylate (d1) (M-313, manufactured by Toagosei Co., Ltd.) as a component (D)

were added and mixed for 60 minutes in a planetary mixer at normal temperature under protection from light, thereby giving Example 1, which is a cationically curable resin composition.

Example 2

Example 2 was prepared in the same manner as in Example 1, except that 0.5 parts by mass of the component d1 in Example 1 was changed to 1 part by mass.

Example 3

Example 3 was prepared in the same manner as in Example 1, except that 0.5 parts by mass of the component d1 in Example 1 was changed to 3 parts by mass.

Example 4

Example 4 was prepared in the same manner as in Example 1, except that, 0.5 parts by mass of the component d1 in Example 1 was changed to 5 parts by mass of diallyl isocyanurate (d2) (reagent).

Example 5

Example 5 was prepared in the same manner as in Example 1, except that 80 parts by mass of the component a1 and 20 parts by mass of the component a2 in Example 1 were changed to 95 parts by mass and 5 parts by mass, respectively.

Comparative Example 1

Comparative Example 1 was prepared in the same manner as in Example 1, except that the component d1 in Example 1 was removed.

Comparative Example 2

Comparative Example 2 was prepared in the same manner as in Example 1, except that 0.5 parts by mass of the component d1 in Example 1 was changed to 10 parts by mass.

Comparative Example 3

Comparative Example 3 was prepared in the same manner as in Example 4, except that 5 parts by mass of the component d2 in Example 4 was changed to 10 parts by mass.

Comparative Example 4

Comparative Example 4 was prepared in the same manner as in Example 1, except that the component c1 in Example 1 was replaced with triphenylamine (c'1).

Comparative Example 5

Comparative Example 5 was prepared in the same manner as in Example 1, except that, 0.1 part by mass of the component c1 in Example 1 was replaced with 1 part by mass of triphenylamine.

Comparative Example 6

Comparative Example 6 was prepared in the same manner as in Example 1, except that the component c1 in Example was excluded.

Comparative Example 7

Comparative Example 7 was prepared in the same manner as in Example 1, except that the component b1 in Example was excluded.

<Photocurability Test>

0.01 g of each cationically curable resin composition was dropped onto a slide glass and covered with a cover glass, thereby preparing a specimen having a cationically curable composition sandwiched as a thin film between the glasses. Next, using a UV irradiator, an active energy ray at a wavelength of 365 nm was applied to an integrated light intensity of 3,000 mJ/cm$^2$. Subsequently, a test was performed to confirm that the glasses adhered to each other so as to be immovable by hands.

<Low-Temperature Curability Test>

0.1 g of each cationically curable resin composition was dropped onto a hot plate set at 80° C., and, after 30 minutes, touched with a pointed rod to evaluate whether the composition had been cured.

<Storage Stability Test>

Immediately after the completion of the preparation of each cationically curable resin composition, the "initial viscosity" was measured using a cone-plate rotational viscometer (E-type viscometer) adjusted to 25° C. Next, each cationically curable resin composition was stored in a shaded plastic container and stored in a 25° C. atmosphere for 24 hours, and then the "post-storage viscosity" was measured. The "degree of change in viscosity" was determined from "post-storage viscosity"/"initial viscosity", and evaluated based on the following evaluation criteria. The results are shown in Table 1. "○" and "⊙" indicate excellent storage stability.

Evaluation Criteria
  ⊙: less than 2.0
  ○: 2.0 or more and less than 4.0
  x: 4.0 or more 1 part by mass of carbon black (SRB Black T-04, manufactured by Mikuni-Color Ltd.) was further added as a black pigment.

<Concealability Test>

The cationically curable resin composition of Example 6 was spread to a thickness of 0.2 mm to prepare a specimen having a smooth surface, and, using a UV irradiator, an active energy ray at 365 nm was applied to an integrated light intensity of 3,000 mJ/cm$^2$. Then, the specimen was

TABLE 1

|  | Component (A) | | Component (B) | Component (C) | | Component (D) | | Photocurability | Low-temperature curability | Storage stability |
| --- | --- | --- | --- | --- | --- | --- | --- | --- | --- | --- |
|  | a1 | a2 | b1 | c1 | c'1 | d1 | d2 |  |  |  |
| Example 1 | 80 | 20 | 5 | 0.1 |  | 0.5 |  | Cured | Cured | ○ |
| Example 2 | 80 | 20 | 5 | 0.1 |  | 1 |  | Cured | Cured | ○ |
| Example 3 | 80 | 20 | 5 | 0.1 |  | 3 |  | Cured | Cured | ○ |
| Example 4 | 80 | 20 | 5 | 0.1 |  |  | 5 | Cured | Cured | ⊙ |
| Example 5 | 95 | 5 | 5 | 0.1 |  | 0.5 |  | Cured | Cured | ⊙ |
| Comparative Example 1 | 80 | 20 | 5 | 0.1 |  |  |  | Cured | Cured | X |
| Comparative Example 2 | 80 | 20 | 5 | 0.1 |  | 10 |  | Cured | Uncured | ⊙ |
| Comparative Example 3 | 80 | 20 | 5 | 0.1 |  |  | 10 | Cured | Uncured | ⊙ |
| Comparative Example 4 | 80 | 20 | 5 |  | 0.1 | 0.5 |  | Cured | Cured | X |
| Comparative Example 5 | 80 | 20 | 5 |  |  | 0.5 |  | Cured | Uncured | ⊙ |
| Comparative Example 6 | 80 | 20 | 5 |  |  | 0.5 |  | Cured | Uncured | ⊙ |
| Comparative Example 7 | 80 | 20 |  | 0.1 |  | 0.5 |  | Uncured | Cured | X |

From Examples 1 to 5, it can be seen that the present invention has excellent storage stability while maintaining photocurability and low-temperature (less than 100° C.) curability.

Comparative Example 1 is a composition that does not contain the component (D) of the present invention, and can be seen to have poor storage stability. In addition, Comparative Examples 2 and 3 are compositions in which more than a predetermined amount of the component (D) of the present invention was added, and both can be seen to have poor low-temperature curability. In addition, Comparative Examples 4 and 5 are compositions in which triphenylamine, a basic compound, was used in place of the component (C) of the present invention. Comparative Example 4 is a composition in which 0.1 parts by mass of triphenylamine was added per 100 parts by mass of the component (A), and resulted in poor storage stability. Comparative Example 5 is a composition in which 1 part by mass of triphenylamine was added per 100 parts by mass of the component (A), and can be seen to have poor low-temperature curability. Comparative Example 6 is a composition that does not contain the component (C) of the present invention, and can be seen to have the low-temperature curability. Comparative Example 7 is a composition that does not contain the component (B) of the present invention, and can be seen to have poor photocurability.

Next, a test to evaluate the concealability of the cationically curable resin composition of the present invention is performed.

Example 6

Example 6 was prepared in the same manner as in Example 1, except that, in Example 1, as a component (E), further heated for 30 minutes in a thermostat at 80° C. to give a cured product. Then, the transmittance (550 nm) of the cured product was measured using a spectrophotometer UV-2450 (manufactured by Shimadzu Corporation). The transmittance was less than 1%, confirming that the cured product had excellent concealability.

INDUSTRIAL APPLICABILITY

The cationically curable resin composition of the present invention has excellent storage stability while maintaining photocurability and low-temperature (less than 100° C.) curability, and thus is applicable to a wide range of fields, including adhesives, sealants, potting agents, coating agents, electrically conductive pastes, sheet-shaped adhesives, and the like. Therefore, the present invention is industrially useful.

The invention claimed is:
1. A cationically curable resin composition comprising:
  component (A): a cationically polymerizable compound;
  component (B): a photo-cationic polymerization initiator;
  component (C): a thermal cationic polymerization initiator; and
  component (D): a compound having an isocyanuric ring,
  wherein a content of the component (D) is 0.01 to 5 parts by mass per 100 parts by mass of the component (A).
2. The cationically curable resin composition according to claim 1, wherein the component (D) is at least one member selected from the group consisting of a compound containing a (meth)acryloyl group and an isocyanuric ring, a compound containing an allyl group and an isocyanuric ring, a compound containing a glycidyl group and an isocyanuric ring, and a compound containing a mercapto group and an isocyanuric ring.

3. The cationically curable resin composition according to claim 1, wherein the component (C) is an aromatic sulfonium-based thermal cationic polymerization initiator or an aromatic iodonium-based thermal cationic polymerization initiator.

4. The cationically curable resin composition according to claim 1, further comprising:
component (E): a pigment.

5. The cationically curable resin composition according to claim 1, wherein the component (A) is a hydrogenated epoxy resin or an alicyclic epoxy compound.

6. The cationically curable resin composition according to claim 1, wherein the component (A) comprises a hydrogenated epoxy resin.

7. The cationically curable resin composition according to claim 1, wherein an amount of the component (B) is 0.1 to 30 parts by mass per 100 parts by mass of the component (A).

8. The cationically curable resin composition according to claim 1, wherein an amount of the component (C) is 0.1 to 30 parts by mass per 100 parts by mass of the component (A).

9. The cationically curable resin composition according to claim 1, wherein the component (A) is at least one selected from a group consisting of a hydrogenated bisphenol A epoxy resin, a hydrogenated bisphenol F epoxy resin, a hydrogenated bisphenol E epoxy resin, a diglycidyl ether of an alkylene oxide adduct of a hydrogenated bisphenol A, a diglycidyl ether of an alkylene oxide adduct of a hydrogenated bisphenol F, a hydrogenated phenol novolac epoxy resin, and a hydrogenated cresol novolac epoxy resin.

10. The cationically curable resin composition according to claim 1, wherein the cationically curable resin composition can be cured by active energy ray irradiation and a low temperature.

11. The cationically curable resin composition according to claim 1, wherein the component (B) is at least one selected from a group consisting of triphenylsulfonium hexafluoroantimonate, triphenylsulfonium tetrakis(pentafluorophenyl)borate, 4,4'-bis[di(β-hydroxyethoxy)phenylsulfonio]diphenylsulfide-bishexafluoroantimonate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-(p-ter-butylphenylcarbonyl)-4'-diphenylsulfonio-diphenylsulfide-hexafluoroantimonate, 4-(p-ter-butylphenylcarbonyl)-4'-di(p-tolyl)sulfoniodiphenylsulfide-tetrakis(pentafluorophenyl)borate, diphenyliodonium tetrakis(pentafluorophenyl)borate, diphenyliodonium hexafluorophosphate, diphenyliodonium hexafluoroantimonate, di(4-nonylphenyl)iodonium hexafluorophosphate, and 4-methylphenyl-4-(1-methylethyl)phenyliodonium tetrakis(pentafluorophenyl)borate.

12. The cationically curable resin composition according to claim 1, wherein the component (A) comprises a hydrogenated bisphenol A epoxy resin in an amount of more than 80 mass % based on the entire component (A).

* * * * *